US012638667B2

(12) United States Patent
Steinert et al.

(10) Patent No.: US 12,638,667 B2
(45) Date of Patent: May 26, 2026

(54) METHOD AND DEVICE FOR MICROSCOPY

(71) Applicant: Carl Zeiss Microscopy GmbH, Jena (DE)

(72) Inventors: Joerg Steinert, Jena (DE); Johannes Bautsch, Braunschweig (DE)

(73) Assignee: Carl Zeiss Microscopy GmbH, Jena (DE)

( * ) Notice: Subject to any disclaimer, the term of this patent is extended or adjusted under 35 U.S.C. 154(b) by 107 days.

(21) Appl. No.: 18/493,407

(22) Filed: Oct. 24, 2023

(65) Prior Publication Data
US 2024/0168272 A1 May 23, 2024

(30) Foreign Application Priority Data
Oct. 25, 2022 (DE) ..................... 10 2022 128 078.0

(51) Int. Cl.
*G02B 21/36* (2006.01)
*G02B 27/00* (2006.01)

(52) U.S. Cl.
CPC ......... *G02B 21/365* (2013.01); *G02B 21/361* (2013.01); *G02B 27/0025* (2013.01)

(58) Field of Classification Search
CPC ............... G02B 21/365; G02B 21/361; G02B 27/0025; G02B 21/367
See application file for complete search history.

(56) References Cited

U.S. PATENT DOCUMENTS

| 11,030,776 B2 * | 6/2021 | Baumgart ................. G06T 5/80 |
| 2008/0180792 A1 * | 7/2008 | Georgiev ............. G02B 21/361 |
| | | 359/368 |

(Continued)

FOREIGN PATENT DOCUMENTS

| DE | 102019130093 A1 * | 5/2020 | ......... G01N 21/6458 |
| DE | 102019218664 A1 | 6/2021 | |

(Continued)

OTHER PUBLICATIONS

Guo et al., Fourier light-field microscopy, Optics Express, vol. 27, No. 18, Sep. 2, 2019, pp. 25573-25594.

(Continued)

*Primary Examiner* — John R Schnurr
(74) *Attorney, Agent, or Firm* — LaBatt, LLC

(57) ABSTRACT

A method including the following: a) a light field microscope records at least one image of a sample, said image consisting of a set of partial images, b) at least one aberration of the imaging system of the light field microscope is specified by a user and/or established from a set of partial images recorded in step a), c) one or both of steps d) and e) are performed using the aberrations of the imaging system specified and/or established in step b): d) reconstructing a three-dimensional image of the sample from the set of partial images, wherein the aberrations of the imaging system which are specified and/or established in step b) are at least partially corrected; e) establishing improved settings of adjustable components of the imaging system which influence wavefronts of the propagated light, on the basis of the aberrations specified and/or established in step b). The invention also relates to a microscopy apparatus.

35 Claims, 7 Drawing Sheets

100

(56)                    References Cited

U.S. PATENT DOCUMENTS

| | | | | |
|---|---|---|---|---|
| 2016/0091705 A1* | 3/2016 | Ben Ezra | ............. | G02B 21/361 |
| | | | | 348/79 |
| 2019/0250390 A1 | 8/2019 | Fahrbach et al. | | |
| 2020/0073022 A1* | 3/2020 | Watanabe | ............. | H04N 23/957 |
| 2020/0250856 A1* | 8/2020 | Baumgart | ............. | G02B 21/361 |
| 2021/0165200 A1 | 6/2021 | Schwedt et al. | | |
| 2022/0019067 A1* | 1/2022 | Anhut | .................. | G02B 21/008 |
| 2022/0270279 A1* | 8/2022 | Leitner | .................... | G06T 5/50 |

FOREIGN PATENT DOCUMENTS

| | | | | | |
|---|---|---|---|---|---|
| EP | 3871030 B1 * | 2/2024 | | .......... | G02B 21/365 |
| WO | 2017191121 A1 | 9/2017 | | | |
| WO | WO-2018211603 A1 * | 11/2018 | | ............. | G03B 15/00 |
| WO | WO-2020108948 A1 * | 6/2020 | | ......... | G01N 21/6458 |

OTHER PUBLICATIONS

Search Report for German Application No. 10 2022 128 078.0
(English translation not available), Mar. 31, 2023, 6 pages.

* cited by examiner

METHOD AND DEVICE FOR MICROSCOPY

REFERENCE TO RELATED APPLICATIONS

The current application claims the benefit of German Patent Application No. 10 2022 128 078.0, filed on 25 Oct. 2022, which is hereby incorporated by reference.

FIELD OF THE DISCLOSURE

In a first aspect, the invention relates to a microscopy method. In a second aspect, the invention relates to an apparatus for light field microscopy in accordance with the preamble of claim 31.

BACKGROUND OF THE DISCLOSURE

A generic microscopy apparatus contains at least the following components: a light field microscope comprising a light source for emitting excitation light, an illumination beam path for guiding the excitation light onto or into a sample, a two-dimensionally spatially resolving detector for detecting light emitted by the sample, a detection beam path at least having a microscope objective and a multi-lens array for imaging light emitted by the sample onto the detector, and a control and evaluation unit for controlling the light source and the detector and for evaluating the measured data obtained from the detector, wherein the control and evaluation unit is configured to control the light source and the detector to record at least one image of the sample, an image comprising in each case a set of partial images (step A).

An arrangement comprising a microscope objective, a multi-lens array and a camera can also be referred to as light field microscope or else light field detector.

Processes in organs, tissues and organisms are increasingly being examined in biomedical research. Light field microscopy (LFM) is increasingly used for recording images quickly. An advantage of light field microscopy is that a volume of several ten to hundred sectional images/z-planes can be reconstructed from a single camera recording, which as a rule is implemented within fractions of seconds. The possible extent of the observed volume in the z-direction in this case depends significantly on the microscope objective used and, in particular, on the numerical aperture thereof.

Various embodiments are possible in light field microscopy. In what is known as spatial domain light field microscopy, a multi-lens array (MLA) is arranged in the detection beam path in a plane conjugate to the object plane. Then, detection is carried out using a camera sensor in the back focal plane of said multi-lens array, this back focal plane then being optically conjugate to the back focal plane (BFP) of the microscope objective.

A method more intuitive for microscopy is what is known as Fourier light field microscopy, in which the multi-lens array (MLA) is arranged in a plane conjugate to the pupil plane of the objective. Detection is once again implemented in the back focal plane (BFP) in the multi-lens array. In this case, real image representations of the sample volume are captured as partial images within the recorded camera image, said real image representations however in each case belonging to different parallactic viewing directions onto the sample. On account of the parallax, an—imaginary—axial shift of an emitting fluorescence molecule in the spatial domain causes a lateral shift of the signal on the camera sensor which is dependent on the position of the respectively considered lens.

The present application makes use of the term point spread function. This is intended to mean the intensity distribution of the light into which a punctiform light source is converted, for example by a lens in the multi-lens array. This function is routinely abbreviated PSF (point spread function).

Various algorithms are available for reconstructing the structural volume information from the raw data.

In a first algorithm, all partial image data from the camera image are initially separated to form an image stack, with each partial image of this stack corresponding to a viewing direction onto the sample. To calculate the image content of a certain axial sample plane, each partial image of this stack is now shifted by the parallactic shift expected for the chosen axial plane. Then, the stack created thus is summated to form an image of a z-plane. To obtain a three-dimensional image, which is also referred to as a 3-D stack, this method is then repeated for the further axial sample planes and a three-dimensional image is then assembled from images for the individual z-planes.

The disadvantage of this method, which is also referred to as a shift & sum (S&S) method, is that detail information may be significantly overlaid by a background signal, especially in the case of densely occupied samples.

In a similar method, the partial images of the image stack are in each case shifted in accordance with the parallactic shift expected for the respectively selected axial plane, in the same way as in the shift & sum method. Unlike in the shift & sum method, however, the images of the stack created thus are subsequently not summed for a z-plane; instead, they are multiplied. This method is therefore also referred to as a shift & multiply method. This method also supplies good results for samples with relatively few emitters in the sample volume.

The three-dimensional images of the sample obtained by means of the shift & sum or shift & multiply method may optionally still be improved by virtue of performing a deconvolution with the total point spread function (PSF) in the multi-lens array. The total point spread function (PSF) in the multi-lens array is composed of the point spread functions of the individual lenses in the multi-lens array.

A further important class of methods for reconstructing a three-dimensional image of the sample emerges from the consideration of an imaging function which describes the effect of the imaging optical system (here: the light field microscope) and which converts the sought spatial (i.e., three-dimensional) distribution of radiation emitters into an image to be observed. The evaluation task now consists of finding the inverse function for this imaging function in order to obtain the sought spatial distribution of radiation emitters from observed image data. These methods include deconvolution methods in particular. In iterative deconvolution methods, for example using the Richardson-Lucy iteration scheme, the inverse imaging function is not determined directly; instead, the distribution of radiation emitters which fits best to the observed image data when the imaging function is applied is sought for iteratively.

A further method uses a joint deconvolution (jDCV) approach. This likewise requires knowledge of the imaging function, for example in the form of the point spread function (PSF), for each micro-lens and the computation times are significantly longer than in the case of shift & sum methods, for instance. In return, a significantly higher contrast image is obtained.

Moreover, what are known as Wiener deconvolution methods can be used in the reconstruction methods in order to reduce the noise at high spatial frequencies.

An apparatus of the generic type and methods for image reconstruction are described in Vol. 27, No. 18/2 Sep. 2019/Optics Express 25573.

A difficulty arising in optical microscopy in general has its roots in disturbances of the ideal optical imaging system, caused in particular by constituent parts of the imaging system from the microscope objective up to a sample to be examined. Microscope objectives are typically optimized for specific parameters of the beam path up to the sample to be examined. In this context, reference is made to standard objectives, and also to standard immersion objectives in the case of immersion objectives. Relevant parameters of the beam path include, inter alia, the thickness of a coverslip, the refractive index of an embedding medium in which the sample is accommodated, the refractive index of an immersion medium, the distance of a sample to be examined from the microscope objective, in particular. Deviations of one or more of these parameters from the standard values, for which the utilized microscope objective is optimized, lead to aberrations which impair the quality of the microscope images per se and, as a consequence, also lead to poorer results in the reconstruction of the structural volume information from the raw data in the images.

SUMMARY OF THE DISCLOSURE

An object of the invention can be considered that of providing a method and an apparatus, by means of which a better reconstruction of the structural volume information from the sample is obtained.

This object is achieved by means of the method having the features of claim 1 and by means of the apparatus having the features of claim 31.

Advantageous variants of the method according to the invention and preferred embodiments of the apparatus according to the invention are explained below, especially in conjunction with the dependent claims and the drawings.

The following method steps are performed in the method according to the invention:
  a) the light field microscope is used to record at least one image of a sample, said image consisting of a set of partial images,
  b) at least one aberration of the imaging system of the light field microscope is specified by a user and/or established from a set of partial images recorded in method step a),
  c) one or both of method steps d) and e) below are performed using the aberrations of the imaging system specified and/or established in method step b):
  d) reconstructing a three-dimensional image of the sample from the set of partial images, wherein the aberrations of the imaging system which are specified and/or established in method step b) are at least partially corrected;
  e) establishing improved settings of adjustable components of the imaging system which influence wavefronts of the propagated light, on the basis of the aberrations specified and/or established in method step b).

According to the invention, the microscopy apparatus of the aforementioned type is characterized in that the control and evaluation unit is also configured
  B) to specify at least one aberration of the imaging system of the light field microscope in accordance with a user input and/or to establish said at least one aberration from a set of partial images recorded in step A), C) to perform one or both of steps D) and E) below using the aberrations of the imaging system specified and/or established in step B):
  D) reconstruct a three-dimensional image of the sample (5) from the set of partial images with at least partial correction of the aberrations specified or established in step B);
  E) establish improved settings of adjustable components of the imaging system which influence wavefronts of the propagated light, on the basis of the aberrations specified or established in step B).

An essential insight of the present invention is that it is possible to use a set of partial images obtained using an imaging system with optical disturbances to nevertheless reconstruct three-dimensional information, which is to say volume information, with good image quality. This is possible, in particular, for imaging systems in which one or more of the relevant optical parameters deviates or deviate from the respective standard parameters, for which the microscope objective is optimized.

A further essential idea of the invention consists of specifying aberrations of the imaging system or, in addition or as an alternative, extracting said aberrations from a recorded set of partial images. The aberrations may also be referred to as wavefront errors. The aberration can be specified, in particular, by specifying a parameter of a component of the imaging system. For example, it may be possible to specify a thickness of a coverslip and/or a refractive index of an embedding medium in which the sample to be examined is embedded.

Finally, an essential basic idea of the invention is that of performing a corrected and/or optimized reconstruction of the volume information using the specified aberrations and/or aberrations extracted from the partial images. In addition or as an alternative, it is possible according to the invention to establish improved settings in view of the imaging quality for components of the imaging system that influence the wavefront of the propagated light, this being able to be done by using the specified aberrations and/or aberrations extracted from the partial images. Then, further images can be recorded after these improved settings have been applied to the respective components.

The basic principle of determining the wavefront and hence of determining the aberrations is comparable to a wavefront measurement by means of a Shack-Hartmann sensor. However, on account of the generally complex nature of the light distribution radiated back from a sample, a simple centroid determination does not suffice to extract the shape of a wavefront.

By decomposing the detection optical unit into a number of subapertures with very small numerical aperture, the number corresponding to the number of lenses in the multi-lens array, it is possible to correct the wavefront errors between the individual aperture regions when combining the images by calculation. A local tilt of the wavefront within a single subaperture brings about a shift of the respective partial image. Within the scope of the correction, it is possible, in principle, to compensate any wavefront error in the pupil by using sampling points whose number corresponds to the number of lenses in the multi-lens array. This compensation corresponds to the effect of an adaptive mirror in a pupil plane, with a number of actuators corresponding to the number of lenses in the multi-lens array.

In general, the nature of the improved settings of the components of the imaging system that influence the wavefront of the propagated light is such that the aberrations established and/or specified in method step b) are compensated for at least in part, and in particular as fully as possible.

If aberrations are specified in step b) and step d) is not performed, then step a) need not be performed either. In that case, the method is a method for finding improved settings of adjustable components of the imaging system which influence wavefronts of the propagated light.

Then, an image of a sample, from which a three-dimensional image of a sample can be reconstructed in a manner known in principle, can be recorded using the improved settings of the adjustable components of the imaging system.

It can be considered to be an essential advantage of the present invention that good quality volume images can be obtained even in the case of imaging systems which deviate from standard imaging systems and in this respect have optical disturbances. This is possible in many cases without requiring changes to the microscope system itself, which is to say the compensation of the optical disturbances can be substantially brought about by the processing of the image data from the partial images.

The excitation light is electromagnetic radiation, in particular in the visible spectral range and adjoining ranges. The only demand placed on the contrast-providing principle by the present invention is that the sample emits emission light as a consequence of the irradiation by the excitation light and/or deflects, scatters or reflects back the excitation light. Typically, the emission light is fluorescence light which the sample, in particular dye molecules present there, emits or emit as a consequence of the irradiation by the excitation light.

At least one light source, for example a laser, may be present for providing the excitation light. The spectral composition of the excitation light can be adjustable, in particular between two or more colours. The excitation light can also simultaneously be polychromatic, for example if different dyes are intended to be detected simultaneously.

The term "illumination beam path" denotes all optical beam-guiding and beam-modifying components, for example microscope objectives, lenses, mirrors, prisms, gratings, filters, stops, beam splitters, modulators, for example spatial light modulators (SLM), by means of which and via which the excitation light from the light source is guided to the sample to be examined.

In particular, the sample may be illuminated via the same microscope objective which is also a part of the detection beam path. Then, a beam splitter may advantageously be present to separate the excitation light from emission light emitted by the sample as a consequence of being exposed to the excitation light. However, a different microscope objective or any other optical device may also be present for illumination purposes, for example in the case of a transmitted-light arrangement or an arrangement for oblique illumination.

Light that is emitted and/or deflected, for example scattered, by the sample to be examined as a consequence of the irradiation by the excitation light is referred to as emission light and reaches the camera via the detection beam path. The term "detection beam path" denotes all beam-guiding and beam-modifying optical components, for example lenses, mirrors, prisms, gratings, filters, stops, beam splitters, modulators, for example spatial light modulators (SLM), by means of which and via which the emission light is guided from the sample to be examined to the detector.

In addition to the microscope objective, the multi-lens array, and the detector, the detection beam path may comprise a sample unit in particular. The imaging system may comprise at least the microscope objective and the sample unit. The sample unit may comprise one or more of the following components: coverslip, embedding medium in which the sample to be examined is embedded, microscope slide, petri dish, immersion medium.

At least one or more of the following components may be present as an adjustable component or adjustable components of the imaging system which influence wavefronts of the propagated light and for which improved settings are found with the aid of the method according to the invention: adjustable microscope objective, adaptive mirror, and spatial light modulator. The adjustable microscope objective may have a correction ring, by means of which it is possible to set for example a thickness of the coverslip that deviates from a standard value and/or a refractive index of the immersion medium that deviates from a standard value. Improved settings may for example also be established and optionally implemented for the distances of lenses in the imaging system.

The detector is a sufficiently fast optical detector comprising a two-dimensionally spatially resolving sensor area. In particular, the detector can be a camera, especially with a CCD, CMOS or SPAD camera chip.

The multi-lens array serves to image light emitted by a sample onto the detector. In this case, it is preferable for the detector to be arranged in a focal plane of the lenses in the multi-lens array or in any case in the vicinity of this focal plane. However, this is not mandatory for the implementation of the present invention. Imaging within this sense may also be blurred. All that is necessary is that the multi-lens array is arranged in a defined and known relative position with respect to the two-dimensionally spatially resolving detector.

The term "control unit" denotes all hardware and software components which interact with the components of the microscope according to the invention for the intended functionality of the latter. In particular, the control unit can have a computing device, for example a PC, and a camera controller capable of rapidly reading out measurement signals.

No particular demand is placed on the microscope objective. In particular, it can be an immersion objective.

The method according to the invention and the apparatus according to the invention are suitable in principle for any type of samples which are accessible to examination by light field microscopy.

The images recorded by the light field microscope in each case comprise a set of partial images. The partial images are those images that are created on the two-dimensionally spatially resolving detector by a single lens in the multi-lens array. The number of partial images thus corresponds to the number of utilized lenses in the multi-lens array. For example, the multi-lens array may comprise 37 or 89 lenses.

All deviations of the observed wavefronts and the observed images from the wavefronts or the images that would be observed in the case of ideal imaging are referred to as aberrations.

The image data obtained by the detector during a measurement may be regarded as a number of partial images and may be evaluated as such, with said number corresponding to the number of utilized lenses in the multi-lens array. However, the entire image measured by the detector, which may be referred to as overall image, may also be regarded as a single image with a corresponding number of image regions. The evaluation of the image information and reconstruction of the volume structure of the sample can be implemented on the basis of some or all partial images or on the basis of the overall image. It is also possible that only portions of all partial images or else only some partial images are considered for the evaluation.

The light field microscopy can be performed as fluorescence microscopy and light sources, especially lasers, suitable for the fluorescence excitation of the dyes used to prepare the samples to be examined are then preferably used as light sources.

In a particularly advantageous embodiment of the apparatus according to the invention, the multi-lens array is arranged in a plane (pupil plane) optically conjugate to the back pupil of the microscope objective. The partial images belonging to the individual lenses then correspond to images of the sample from different parallactic angles. In this variant referred to as Fourier light field microscopy, the partial images are clearly understandable. However, the present invention is not restricted to Fourier light field microscopy. Rather, the variant referred to as spatial domain light field microscopy can be used for the method according to the invention and the apparatus according to the invention, within the scope of which the multi-lens array is arranged in a plane (intermediate image plane) optically conjugate to a plane of the sample.

Moreover, arrangements and method variants in which the multi-lens array is situated neither in an intermediate image plane nor in a pupil plane are also possible. The image data obtained using such arrangements contain the same information in principle. The methods for reconstructing a three-dimensional image of the sample must then be adapted using the respectively applicable geometric parameters of the imaging system, in particular the relative position in the multi-lens array with respect to an intermediate image plane and/or a pupil plane.

The apparatus according to the invention can be configured to carry out the methods according to the invention.

To have a larger data basis in view of establishing aberrations from the partial images, images can be recorded at a plurality of different distances of the sample relative to the microscope objective in advantageous variants of the method according to the invention.

As a rule, the distance of the sample relative to the microscope objective means the distance of the sample from the microscope objective in the direction of the optical axis. For example, a nominal position of a z-drive can be taken as the distance of the sample from the microscope objective. Then, the image information for different distances of the sample from the microscope objective can be used to determine the wavefront aberrations. This allows parameters actually existing in the imaging system to be determined more accurately, for example a thickness of the immersion medium or a refractive index of an embedding medium.

In a further preferred variant of the method according to the invention, disturbing image components in the partial images are removed or reduced before the partial images are evaluated in method step b) for the purpose of establishing aberrations. By way of example, background signal, noise components and/or structures not of interest can be removed, in particular by using image processing software. For example, a rolling ball algorithm can be used to reduce or remove disturbing image components.

In principle, it is possible that aberrations, for example a spherical aberration, are specified in terms of value in method step b). However, a preferred variant of the method according to the invention is distinguished in that the specification of an aberration of the imaging system of the light field microscope in method step b) is brought about by a user input of at least one parameter of at least one component of the imaging system which accompanies the relevant aberration. Parameters of a sample being read, in particular in automated fashion, for example from a data carrier, for example an RFID tag, on a sample module or a sample unit may also be considered to be a user input.

In particular, at least one of the following parameters can be specified by a user in method step b): refractive index of an embedding medium in which the sample is embedded; distance of the sample to be examined from the coverslip, effective thickness of an embedding medium, thickness of a coverslip and refractive index of an immersion medium.

In principle, any aberration of the wavefront can be extracted from the partial images and it is consequently possible to establish any aberration. Aberrations can be in particular: spherical aberration, axial astigmatism and field-dependent astigmatism. In a preferred variant of the method according to the invention, at least the aberration of the spherical aberration is established as aberration.

To limit the computational outlay and increase the robustness of the evaluation, it may be preferable for the wavefront aberrations permitted for the purpose of establishing aberrations to be restricted to permitted forms to be defined. Preferably, the wavefront aberrations can be restricted to a finite number of Zernike polynomials within the scope of establishing aberrations. For example, to establish aberrations, the wavefront aberrations may be restricted to Zernike polynomials up to a certain maximum order.

Mixed forms of the method variants are possible inasmuch as some aberrations can be specified, for example the spherical aberration, and other aberrations can be established from the image data.

A further preferred variant of the method according to the invention is distinguished in that at least one aberration is established in method step b) by evaluating at least one microscopic structure of the sample in the partial images recorded in method step a). This means that the sample must necessarily have a certain structure so that aberrations can be established.

A further preferred variant of the method according to the invention is distinguished in that at least one aberration is established in method step b) by determining at least one actually present parameter of at least one component of the imaging system which accompanies the relevant aberration.

It is preferable in this case that the actually present parameter accompanying the relevant aberration can be determined by evaluating the microscopic structure of the sample in the partial images, with consideration being given to at least one standard parameter or nominal parameter of at least one component of the imaging system.

Standard parameters refer to those parameters, for example of the sample, the embedding medium, the coverslip and/or the immersion medium, for which the respective microscope objective is optimized.

Nominal parameters refer to parameters, for example of the embedding medium, the coverslip and/or the immersion medium, which should be present at these components, for example according to the data sheet.

Actual parameters refer to the physical quantities actually present in each case at the individual components.

By way of example, the nominal parameters or standard parameters of the imaging system may contain parameters of at least one of the following components: microscope objective, immersion medium, embedding medium, coverslip, and immersion objective.

For example, it is possible to determine at least one of the following actually present parameters: distance of the sample relative to the microscope objective, a refractive index of an embedding medium in which the sample is embedded, a refractive index of the sample, a focal length of the microscope objective, thickness and/or refractive index of the immersion medium, and thickness of the coverslip.

In a preferred variant of the method according to the invention, the following method steps are performed:

I) a sample structure which appears suitable for establishing the aberrations is searched for in one of the partial images, II) a pose in the z-coordinate is established for this sample structure by virtue of the sample structure being searched for in the partial images and the respective positions of the sample structure in the partial images being compared with positions that are to be expected in each case in the partial images for a specific z-coordinate, wherein III) the z-value that fits best to the observed positions of the sample structure in the partial images is taken as the value for the z-coordinate of the sample structure, and IV) the wavefront error for the partial images is determined in each case by comparing the positions of the sample structure in the partial images, as expected in each case on account of the obtained z-coordinate, with the respectively observed positions of the sample structure in the partial images.

A sample structure may be considered suitable for establishing the aberrations if it has a comparatively small extent in the z-coordinate, which is to say if, in other words, the sample structure can be assigned a z-coordinate.

By way of example, the comparison in step II) can be performed in each case by calculating a cross correlation of at least one portion of a reference image containing the sample structure at least with corresponding portions of the partial images and the z-value which fits best to the results of the cross correlations can be taken as the value for the Z-coordinate of the sample structure.

In step IV), the wavefront error for the partial images can be determined in each case by comparing displacements which are expected in the partial images in each case on account of the obtained z-coordinate with the results of the cross correlations respectively obtained for the partial images.

In steps II and III), the value of the z-coordinate for the sample structure which fits best to the results of the comparison, in particular the results of the cross correlations, can be searched for with the aid of suitable numerical adaptation methods or fit routines, in each case using the shifts that are to be expected in the partial images in each case on account of a specific z-coordinate.

The reference image can preferably also be segmented before a suitable sample structure is searched for. For example, the reference image can be segmented with a periodic grid.

In principle, any of the individual partial images can be chosen as reference image. Preferably, the partial image which belongs to a lens in the multi-lens array lying symmetrically with respect to the optical axis is chosen as reference image; this partial image is also referred to as central partial image.

To limit the computational outlay and increase the speed, it may be advantageous to calculate the cross correlations only for portions of the partial images in each case. In this case, for example, the portions can be defined by way of a grid, in particular a periodic grid.

As an alternative or in addition, regions of interest may also be searched for in the partial images, in particular automatically, and the portions for which the cross correlations are calculated can be chosen so that they at least partially cover the regions of interest.

By way of example, the regions of interest can be searched for in the partial images using image recognition software, optionally using artificial intelligence.

For some method variants, it may be advantageous to calculate an image, in the camera plane, of a reconstructed three-dimensional image located in the object space. Essentially, this is implemented by convolving the three-dimensional image with an overall point spread function in the multi-lens array. The image obtained thus may be referred to as simulated image.

Prior to aberrations being established from the partial images, a three-dimensional image is initially reconstructed from the partial images without error correction in a further advantageous variant of the method according to the invention.

Methods known in principle can be used to reconstruct the three-dimensional image without error correction. By way of example, the three-dimensional image reconstructed without error correction can be created by deconvolving the partial images with the nominal point spread functions of the individual lenses in the multi-lens array.

In a further advantageous variant of the method according to the invention, the following method steps are performed: at least one structure sufficiently localized in the z-coordinate, in particular at least one image plane lying perpendicular to the optical axis, is selected from the three-dimensional image reconstructed without error correction, partial images in the camera plane are calculated for the selected structure (simulation), the calculated partial images are compared with the measured partial images and the aberrations of the imaging system are determined from the result of the comparison using the z-coordinate of the selected structure.

For the comparison of the calculated partial images with the measured partial images, it is possible to resort to methods, known in principle, for the comparison of images. By way of example, the comparison of the calculated partial images with the measured partial images can be performed by virtue of cross calculations of the calculated partial images with the measured partial images being calculated.

Thus, specifically, an image in the camera plane which consists of a number of partial images whose number corresponds to the number of used lenses in the multi-lens array is calculated for the selected structure, for example the image plane, with the aid of a mapping function, which is to say the whole point distribution function in the multi-lens array. Thereupon, the cross correlation with the respective corresponding partial image of the actually measured image is calculated for each of these partial images. Because the z-position of the image plane for which the image in the camera plane is calculated is known, the wavefront error can be determined from the cross correlations for each lens in the multi-lens array. Typically, the individual cross correlations each supply a maximum at a specific (x, y)-coordinate, and consequently a shift corresponding to the wavefront error. This wavefront error specifies the deviation of the real image vis-à-vis the mapping function used for the calculation, which is to say the simulation.

Advantageously, an image plane perpendicular to the optical axis in which at least one easily evaluable sample structure is situated is selected for this method variant from the three-dimensional image reconstructed without error correction.

For example, the image plane for which the calculated cross correlations with the measured image supply maximum values can particularly preferably be selected as the image plane. In order to obtain more accurate data for the wavefront errors, the described evaluation can be implemented for several or even all of the axial image planes.

The image of the selected image plane in the camera plane can be calculated using corrected point spread functions of the lenses in the multi-lens array. In principle, this may be implemented in a plurality of iteration steps, wherein respectively established aberrations are given consideration in the calculation of the image of the selected plane in the camera plane.

For example, the aberrations determined thus can be adapted between the iteration steps in iterative methods for reconstructing the three-dimensional image. This relates to a method variant in which, in a certain sense, steps b)/B) "establishing the aberrations from a recorded set of partial images" and d)/D) "reconstructing the volume information" from the "set of partial images with consideration being given to the established aberrations" are performed iteratively and in parallel.

The following method steps are performed in a further particularly preferred variant of the method according to the invention which is comparatively robust and not particularly susceptible to errors:

i) a three-dimensional image is reconstructed from a measured image of the sample using a specified aberration, ii) an image in the camera plane is calculated for the obtained three-dimensional image (simulation), iii) a comparison with the measured image is performed for the image in the camera plane calculated thus, iv) the aberration specified in step i) is varied on the basis of the result of the comparison, and v) steps i) to iv) are repeated until a sufficient correspondence is obtained between the calculated image in the camera plane and the measured image.

Advantageously, the iteration can be started with an ideal system during a first run through of this method. Then, the aberration specified in step i) would be zero during the first run through of the method.

For the comparison in step iii), it is possible again to resort to methods, known in principle, for the comparison of images. By way of example, respective cross correlations with the measured partial images can be calculated for the partial images of the calculated image.

By way of example, the aberration specified in step i) can be a spherical aberration.

In particular, the aberration in step i) can be specified by specifying at least one parameter of a component of the imaging system or the sample unit which characterizes the relevant aberration or accompanies the latter, for example: thickness of a coverslip, refractive index of an embedding medium. The correct parameter or parameters can be considered found once a minimal deviation between the simulated image and the actually measured image is reached.

Methods known as a matter of principle can be used for the comparison in step iii) of the image in the camera plane with the measured image. For example, the comparison of the calculated image in the camera plane with the measured image can be performed by calculating cross correlations or calculating sums of the squared deviations.

In further preferred variants of the method according to the invention, the reconstruction of the three-dimensional image with the corrections of the aberrations is implemented by reconstructing the actual partial images with corrected point spread functions of the individual lenses in the multi-lens array. Within the scope of this description, the term actual partial image means the raw data from the camera chips, from which background noises or other disturbing components have optionally been removed, as explained above. The images measured by the camera, which is to say the actual partial images, may also be referred to as raw images.

The corrected point spread functions of the individual lenses can in principle be determined in different ways. By way of example, the corrected point spread functions used for the reconstruction can be recalculated with consideration being given to the aberrations specified and/or established in method step b). As an alternative or in addition, the point spread functions used for the reconstruction can be modified by a correction term which gives consideration to the aberrations specified and/or established in method step b). For example, the correction term can be a spherical correction term, and consequently a correction term which is rotationally symmetric with respect to the optical axis. Other and more complex correction terms are possible.

In principle, known methods can be used for the reconstruction, for example shift & sum methods, shift & multiply methods, Wiener deconvolution methods, iterative methods, for example using a Lucy-Richardson algorithm. A shift & sum method or a shift & multiply method can in each case be followed by a deconvolution with an overall point spread function of the multi-lens array. Further, the image information from individual z-planes can be established by methods for unmixing, matrix deconvolution or singular value decomposition (SVD), known in principle. Finally, methods known from tomography can also be used, in particular using the established aberrations, and derivatives and variants thereof, for the purpose of reconstructing the three-dimensional sample images.

In principle, improved settings for all components of the imaging system which influence the wavefronts of the propagated light in any way can be established in method step e). For example, improved settings can be established in method step e) for one or more of the following components: adjustable microscope objective, adaptive mirror, spatial light modulator (SLM), position-variable and/or shape-variable and/or angle-variable mirror.

The improved settings of the respective component or components of the imaging system, as established in method step e), can be displayed to a user and/or be stored. For example, improved settings of the components can be stored as belonging to a specific sample unit. The settings stored thus, for example of an adaptive mirror, of a microscope objective and/or of an SLM, then can be such that they represent the best possible settings of the respective components for the respective sample, with the result that for example deviations of nominal parameters or standard parameters, which for example exist in relation to the embedding medium or the coverslip of the sample or the sample unit, are corrected to the best possible extent.

The aberrations established in method step b) can also be used in the case of relatively complex optical elements, for example adaptive mirrors and/or spatial light modulators, in order to compensate these aberrations and hence in particular to improve the resolution and/or to reduce reconstruction artefacts. In principle, any optical component that can be changed in respect of its position and/or angle in the beam path or in respect of its effect can be adapted or modified on the basis of the established aberrations. When processing the data, consideration can be given to the established aberrations and/or the changes in the respective changeable optical components.

In addition or as an alternative, provision can also be made for the improved settings of the respective component, as established in method step e), to be applied to at least one of the respective components, optionally following a confirmation by a user. Then, after the improved settings were applied to the relevant components, it is preferably possible to record further microscope images with improved imaging properties.

The established aberrations and/or the established parameters which accompany the aberrations can also be used in further microscopy techniques, beyond the use in light field microscopy itself. Examples of this once again include the reconstruction of microscopic images and the setting of parameters of the imaging system, for example parameters of an adjustable microscope objective.

By way of example, the established aberrations or the associated parameters can also be used when processing measurement data which, despite being obtained by the same imaging system consisting of microscope objective and sample unit, were obtained using different detectors and/or different contrast methods. For example, the apparatus according to the invention may include a laser scanning microscope for examining the sample, wherein the microscope objective is at least a part of a detection beam path of the laser scanning microscope. Optionally, the microscope objective may also be part of the illumination beam path of the laser scanning microscope.

Finally, parameters of a sample or a sample unit (e.g., thickness of a coverslip, refractive index of an embedding medium, distance of the sample), which were established using the method according to the invention and/or an apparatus according to the invention, can be used when examining the sample or the sample unit using a different microscopy method and/or different microscope systems. Advantageously, such established parameters can be stored, for example in a storage medium attached to the sample unit.

BRIEF DESCRIPTION OF THE DRAWINGS

Further advantages and properties of the present invention are described below with reference to the attached drawings, in which.

Figure 1:
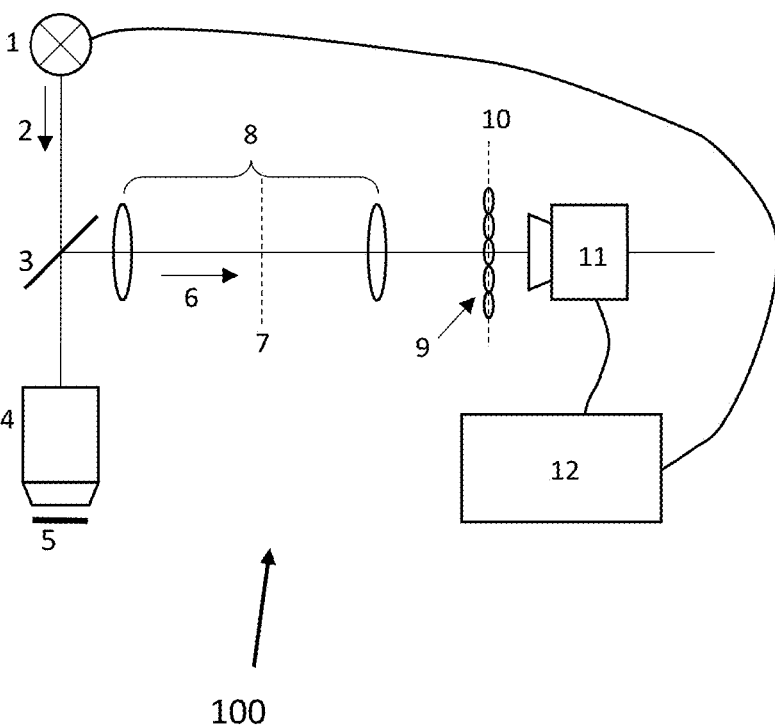
FIG. 1 shows a schematic overview of a light field microscope according to the invention.

Components that are the same or act in the same way are generally characterized by the same reference signs in the figures.

DETAILED DESCRIPTION

An example of an apparatus according to the invention which is configured and suited to perform the method according to the invention is explained with reference to FIG. 1. The apparatus shown therein contains a light field microscope 100 which comprises the following as essential components: a light source 1, typically one or more lasers, for emitting excitation light 2, an illumination beam path for guiding the excitation light 2 onto or into a sample 5, a two-dimensionally spatially resolving detector 11 for detecting light 6 emitted by the sample 5, and a detection beam path with a microscope objective 4 and a multi-lens array 9 for guiding the light 6 emitted by the sample 5 onto the detector 11. In the exemplary embodiment shown in FIG. 1, the sample 5 is illuminated with the excitation light 2 via the same microscope objective 4 which is also part of the detection beam path. The detector 11 is arranged in or in the vicinity of a focal plane of the multi-lens array 9 and can typically be a CMOS, CCD or SPAD camera. The multi-lens array 9 could also be part of the objective 4 and be arranged in the back focal plane thereof.

Finally, a control and evaluation unit 12, which may in particular be a computer of the type known per se, is present for the purposes of controlling the light source 1 and the detector 11 and for the purposes of evaluating the measurement data obtained from the detector 11.

The light 2 emitted by the light source 1, in particular excitation light for fluorescent dyes used to prepare the sample 5, reaches the microscope objective 4 through a dichroic beam splitter 3 and is focused into a sample plane on or in the sample 5 by means of said microscope objective. Emission light emitted by the sample 5, in particular fluorescence light emitted by fluorescent dyes, returns to the dichroic beam splitter 3 via the microscope objective 4 and is reflected at said dichroic beam splitter in the direction of a relay optical unit 8. The relay optical unit 8 consists of two lenses arranged like a telescope with respect to one another. An intermediate image plane, which is to say a plane optically conjugate to the sample plane, is situated at the position 7. After passing through the relay optical unit 8, the emission light reaches a multi-lens array 9, which is arranged in a plane optically conjugate to the back focal plane of the microscope objective 4 (objective pupil BFP). The individual lenses of the multi-lens array 9 generate partial images 201, . . . , 289 (see FIGS. 4 and 5) on the detector 11 arranged in a focal plane of the multi-lens array 9, said partial images respectively being individual images of the sample 5 from different angles, more precisely: different parallax angles. Thus, an image 200 recorded using the light field microscope 100 comprises a respective set of partial images 201, . . . , 289 (see FIG. 4).

The arrangement with the multi-lens array 9 arranged in a pupil plane, shown in FIG. 1, is a set-up for Fourier light field microscopy. Alternatively, what is known as spatial domain light field microscopy would also be possible for implementing the invention, within the scope of which a multi-lens array is arranged in a plane in the detection beam path optically conjugate to the object plane (rather than the back focal plane of the microscope objective 4). The raw image information obtained by the spatial domain light field microscopy is related to that obtained by Fourier light sheet microscopy by way of a Fourier transformation. Ultimately, the result of both methods is in principle the same, however. Intermediate forms are possible, too, in which the multi-lens array is situated somewhere between an intermediate image plane and a pupil plane.

A module for laser scanning microscopy, not shown in FIG. 1, may be available for the purposes of recording a three-dimensional overview image of the sample 5.

In particular, the microscope objective can be an adjustable microscope objective (corr objective), in which an adjustment, for example in relation to a refractive index of an embedding medium, can be implemented using what is known as a corr ring. The microscope settings may be controllable by a controller, in particular the control and evaluation unit 12.

In real embodiments, the apparatus 100 according to the invention can comprise numerous further optical components, in particular mirrors, lenses, colour filters and stops, the function of which is known per se and which are therefore not specifically described in the present description. Furthermore, controllable components which influence the wavefronts of the propagated light can be present, for example spatial light modulators and/or deformable mirrors. These components are likewise not illustrated in FIG. 1.

According to the invention, the control and evaluation unit 12 is configured A) to control the light source 1 and the detector 11 to record at least one image 200 of the sample 5, an image 200 comprising in each case a set of partial images 201, . . . , 289;

B) to specify at least one aberration of the imaging system of the light field microscope 100 in accordance with a user input and/or to establish said at least one aberration from a set of partial images 201, . . . , 289 recorded in step A), C) to perform one or both of steps D) and E) below using the aberrations of the imaging system specified and/or established in step B):

D) reconstruct a three-dimensional image of the sample 5 from the set of partial images 201, . . . , 289 with at least partial correction of the aberrations specified and/or established in step B);

E) establish improved settings of adjustable components of the imaging system which influence wavefronts of the propagated light, on the basis of the aberrations specified and/or established in step B).

Figure 2:
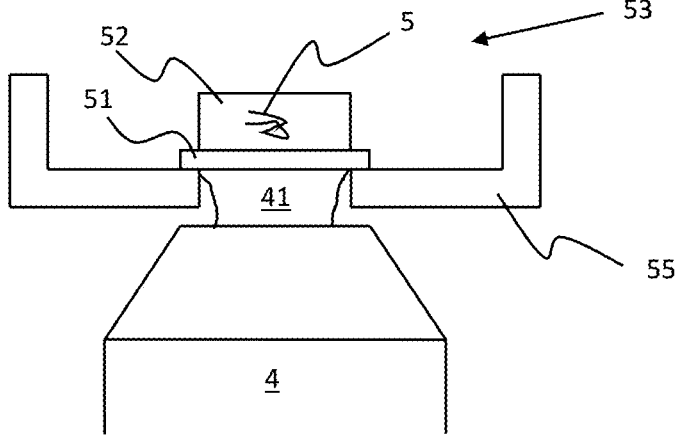
FIG. 2 shows a schematic view of an arrangement of a sample when the microscope objective views the sample from below.

FIG. 2 shows an arrangement of the sample in the case of an inverted orientation of the microscope objective 4. In the example shown, the microscope objective 4 is an immersion objective. In the example of FIG. 2, a sample unit 53 consists of the sample 5 itself, which is situated in an embedding medium 52, a coverslip 51, a petri dish 55, and an immersion medium 41. The following parameters are relevant to the imaging quality of the imaging system: refractive index of the embedding medium 52, thickness and refractive index of the coverslip 41, thickness and refractive index of the immersion medium 41, and distance of the sample 5 from the microscope objective 4. Specific standard parameters for these quantities are assumed for the dimensioning of the microscope objective 4. In other words, the microscope objective 4 is optimized for specific standard parameters. Aberrations arise if one or more of the parameters actually present, for example the refractive index of the embedding medium 52, deviate from the standard parameters. Giving consideration to these aberrations within the scope of the image evaluation, which is to say within the reconstruction of the three-dimensional images, is one of the essential goals of the present invention.

Figure 3:
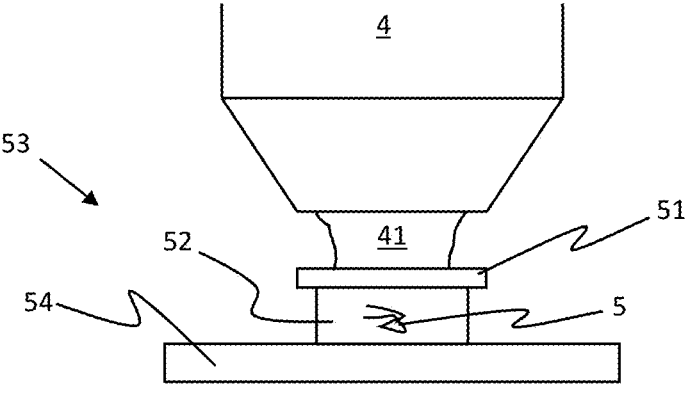
FIG. 3 shows a schematic view of an arrangement of a sample when the microscope objective views the sample from above.

The alternative arrangement in FIG. 3 substantially differs from the one in FIG. 2 in that the microscope objective 4 in FIG. 3 views the sample 5 from above. In the example of FIG. 3, the sample unit 53 consists of the same components as in FIG. 2, with the only difference being that a microscope slide 54 is present in place of the petri dish 55. The same parameters as in FIG. 2 are relevant to the imaging quality of the imaging system.

The coverslip can be dispensed with in further possible arrangements. Then, the embedding medium and the immersion medium can be identical. Furthermore, a sample can be placed on the immersion medium when a microscope objective views upwardly.

Figure 4:
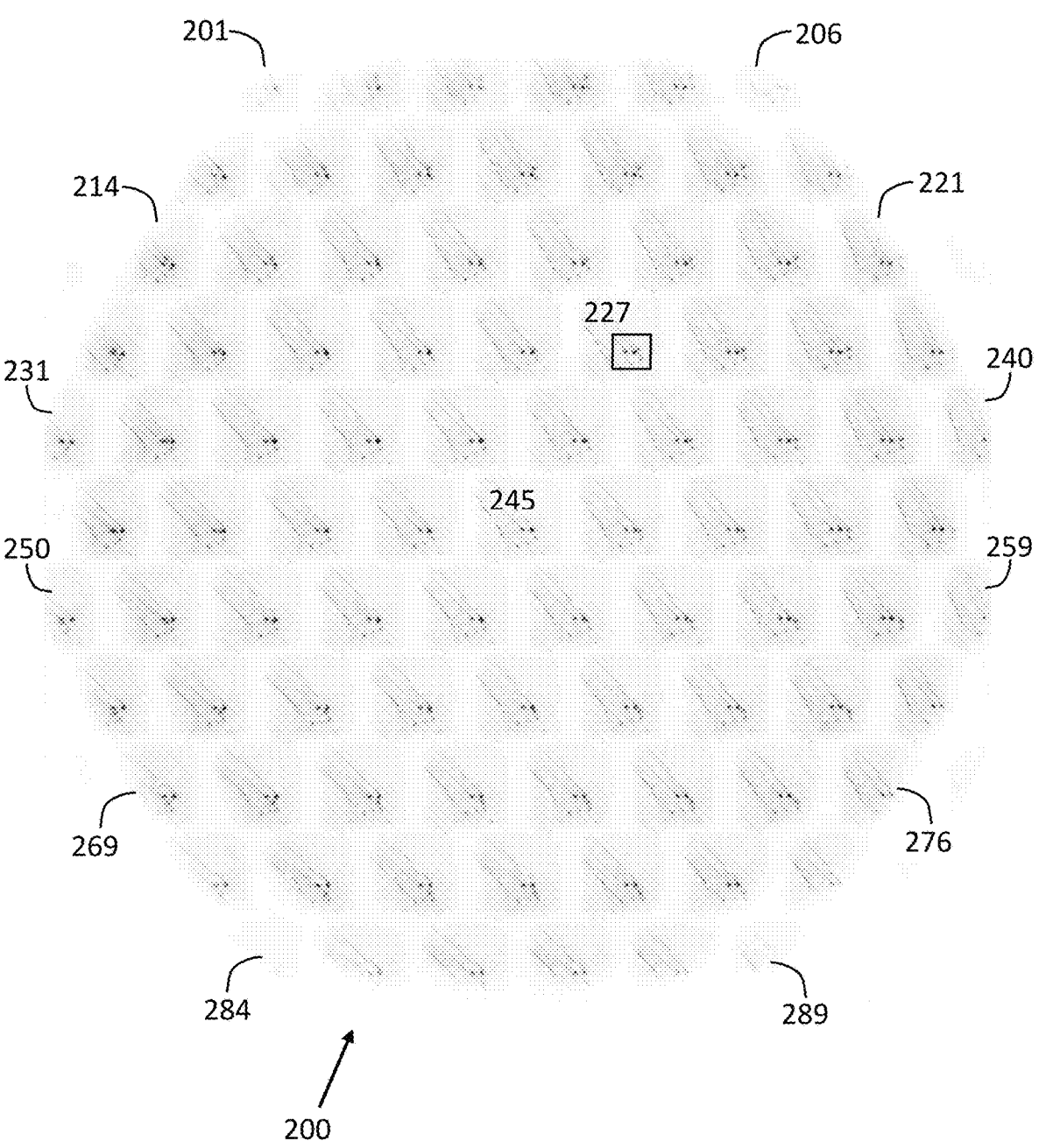
FIG. 4 shows an example of a set of partial images recorded using the light field microscope.

FIG. 4 shows an image 200 consisting of a set of partial images 201 to 289, which was recorded using an apparatus of the type shown in FIG. 1. The individual partial images 201 to 289 respectively correspond to the images generated on the detector 11 by a single lens in the multi-lens array 9. Overall, the image 200 shown in exemplary fashion in FIG. 4 comprises 89 partial images, corresponding to the number of lenses in the multi-lens array 9. These partial images are numbered from 201 to 289 in FIG. 2, from top left to bottom right, with the number being specified for some of the partial images. Reference sign 245 denotes the central partial image which belongs to the lens in the multi-lens array 9 positioned symmetrically with respect to the optical axis z. Consequently, the individual partial images 201 to 289 are images of the sample 5 from different directions; reference is made to different parallax angles. The examined sample 5 is a sample from the brain of a mouse. In principle, living organisms could and should also be examined.

Figure 5:
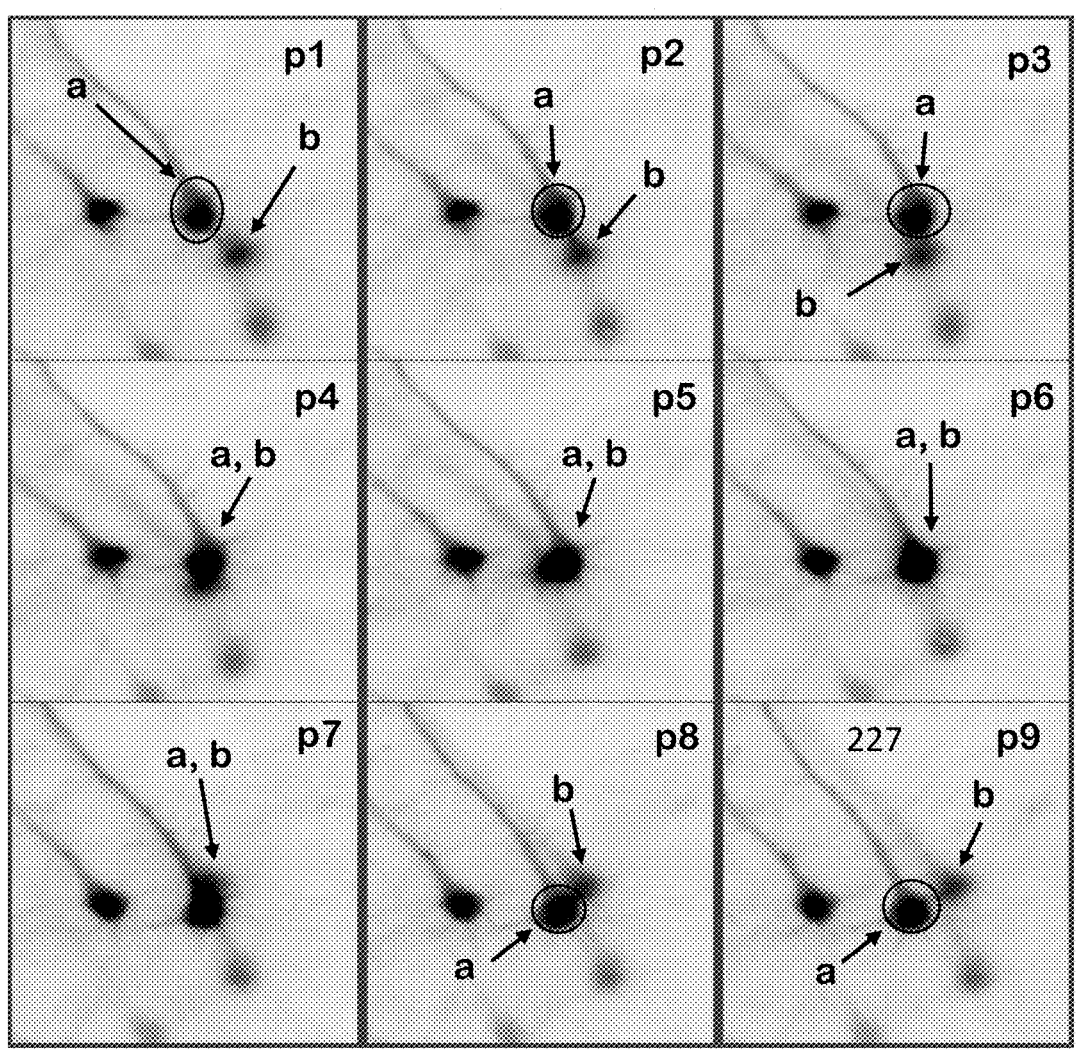
FIG. 5 shows portions from the partial images of FIG. 4 with selected positions.

In the images in FIGS. 4 and 5, bright regions represent a small light input and dark regions represent a high light input on the camera.

FIG. 5 shows portions p1 to p9 from different partial images in each case. In this case, the portion p9 is a portion from the partial image 227, which is likewise shown (not to scale) in FIG. 4. Reference sign a denotes a first microscopic structure, which can optionally be used to establish the aberrations. Specifically, this is a structure of a nerve cell in the brain of a mouse. From the positions of a further structure b relative to the first structure a in portions p1 to p9, which are different in each of the individual images, it becomes clear that the sample 5, as seen from the different lenses, respectively appears at a different parallax angle.

Using nominal parameters and/or standard parameters of the imaging system, the acquired image data can now be evaluated in accordance with one of the methods explained above in detail, and actually present parameters of the imaging system, in particular of the examined sample unit, for example a refractive index of an embedding medium, a thickness of an employed coverslip, can be established. For example, the cross correlations with the central image part 227 can be carried out in each case for the image portions shown in FIG. 5 in exemplary fashion.

Figure 6:
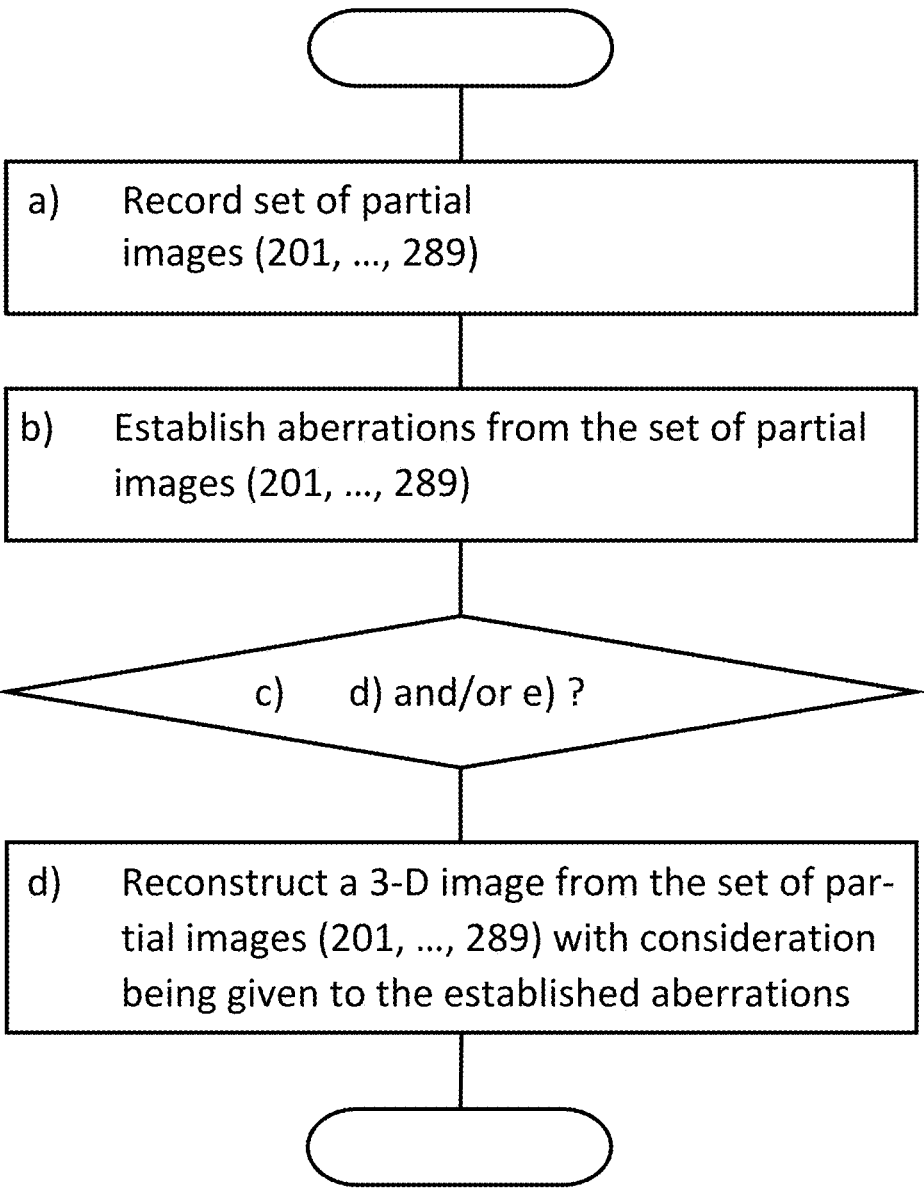
FIG. 6 shows a flowchart of a first variant of the method according to the invention.
Figure 7:
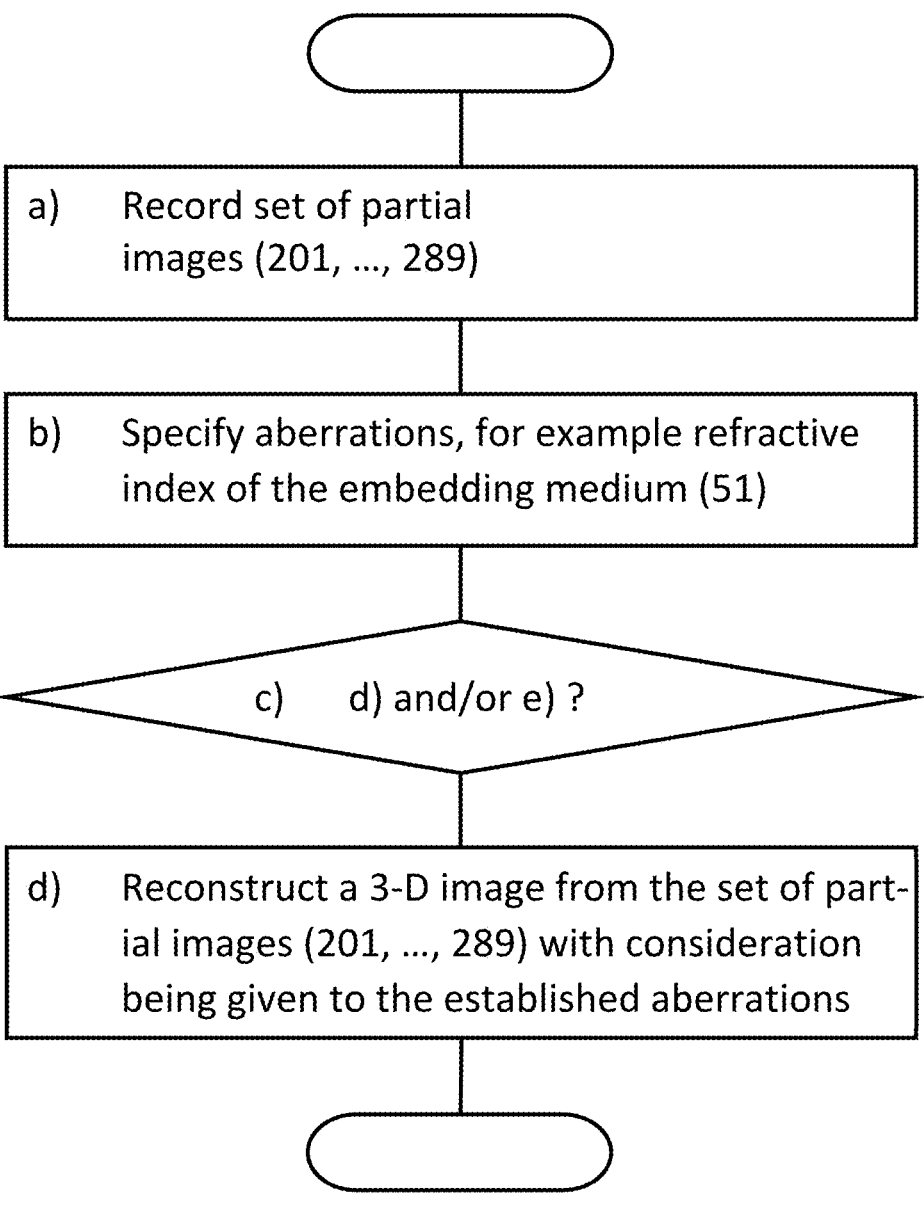
FIG. 7 shows a flowchart of a second variant of the method according to the invention.
Figure 8:
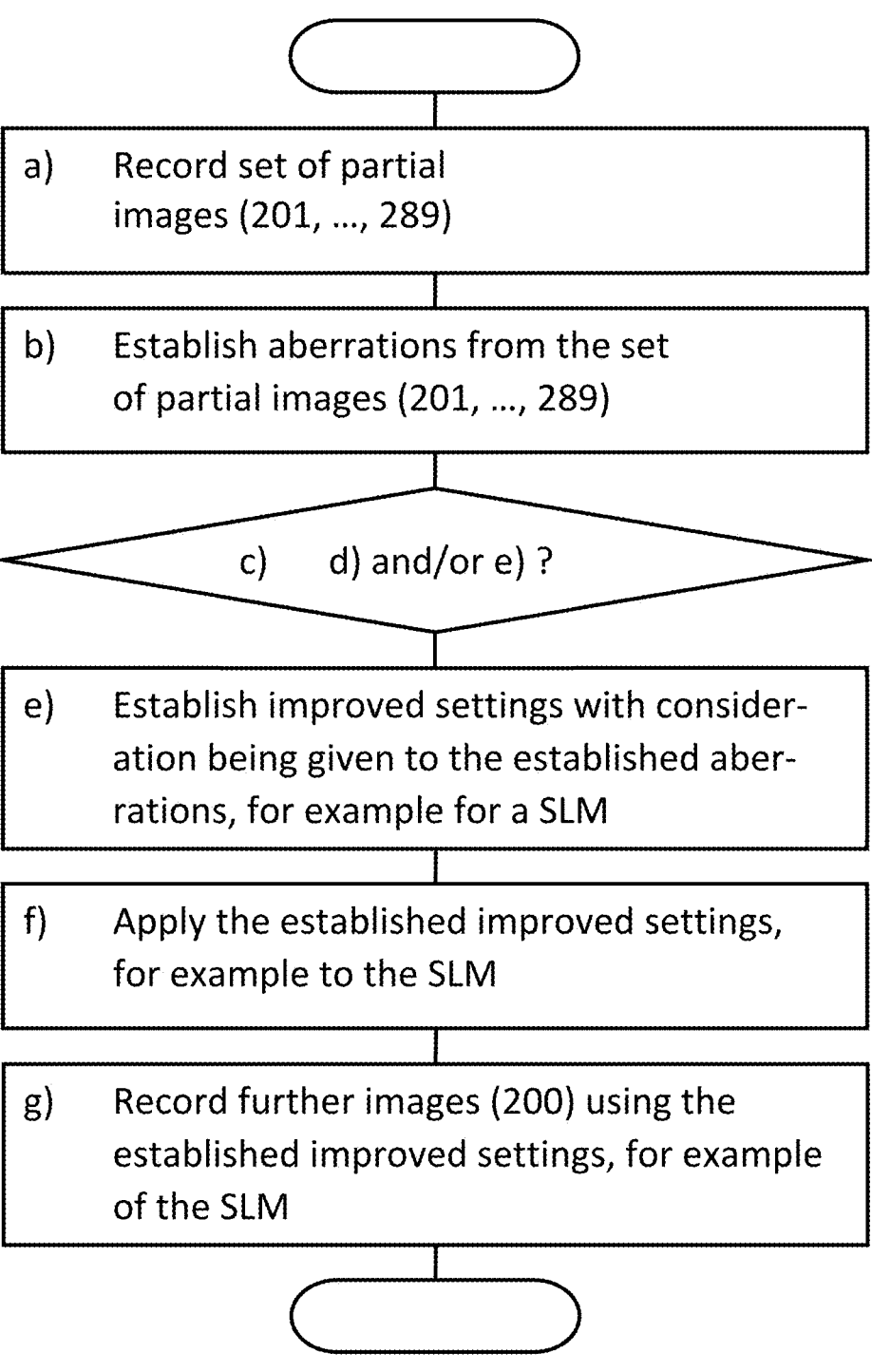
FIG. 8 shows a flowchart of a third variant of the method according to the invention.

Fundamental variants of the method according to the invention are explained in the context of FIGS. 6 to 8.

In the first method variant illustrated in the flowchart of FIG. 6, the light field microscope 100 is initially used in method step a) to record at least one image 200 consisting of a set of partial images 201, . . . , 289. Optionally, images 200 of the sample 5 may be recorded at different distances from the microscope objective 4, in view of broadening the data basis for the evaluation in view of aberrations. To this end, a z-drive, not shown in FIG. 1, can be actuated in each case, in particular in automated fashion.

Subsequently, in method step b), the aberrations of the imaging system used for recording the at least one image 200, for example actually present parameters such as refractive index of the embedding medium 52, thickness of the coverslip 51 (see FIGS. 2 and 3), are determined from the collected image data, which is to say from the at least one set of partial images 201, . . . , 289, in accordance with one of the methods described above in detail.

Subsequently, in step c), there is a decision as to whether three-dimensional images (3-D images) should be reconstructed (method step d)) and/or whether settings of components of the imaging system which influence the wavefront of the propagated light should be established (method step e)).

Method step b) is performed in the example of FIG. 6, which is to say a three-dimensional image (3-D image) is reconstructed from the image data recorded in method step a), with consideration being given to the aberrations established in method step b). In detail, this reconstruction can be implemented in accordance with the above-described embodiment variants of the method according to the invention.

The substantial difference of the method variant illustrated in FIG. 7 in comparison with the one from FIG. 6 is that the aberrations are not determined from the recorded set of partial images like in FIG. 6; instead, they are specified. For example, parameters which accompany the aberrations and consequently characterize the latter can be read from an RFID tag arranged on a sample module, a sample unit or a part of a sample unit. For example, a refractive index of the embedding medium present in the sample unit and/or a thickness of a coverslip present in the sample unit may be stored in the RFID tag.

However, like in FIG. 6, the light field microscope 100 is used in method step a) of FIG. 7 to record an image 200 or a plurality of images, optionally at different distances between the sample 5 and the microscope objective 4, wherein the images 200 respectively consist of a set of partial images 201, . . . , 289.

Then, at least one aberration, for example a refractive index of the embedding medium 52 in which the sample 5 is embedded (see FIGS. 2 and 3), is specified in method step b). It should be observed that the sequence of steps a) and b) can be interchanged in this method variant. In particular, method steps a) and b) may also fully or partially overlap in time, which is to say the at least one aberration can be specified concurrently with the recording of the images.

Like in FIG. 6, method step d) is then performed in FIG. 7 following decision c), but now with the stipulation that the 3-D image is reconstructed from the image data recorded in method step a) with consideration being given to the aberration specified in method step b). This reconstruction again can be implemented in accordance with the embodiment variants of the method according to the invention which are described in detail above.

The variant of the method according to the invention illustrated in FIG. 8 corresponds to the variant in FIG. 6 in view of method steps a) and b).

In contrast with FIG. 6, however, no 3-D image is reconstructed in FIG. 8 following the decision in step c). Rather, improved settings of components of the imaging system, in particular of the detection beam path, which influence wavefronts of the propagated light are established on the basis of the aberrations which were established in method step b) from the partial images 201, . . . , 289 that were recorded in method step a). For example, the improved settings can be settings of a spatial light modulator which are improved in view of the imaging quality, said spatial light modulator for example being arranged in a plane of the detection beam path optically conjugate to the back focal plane of the microscope objective 4 (not shown in FIG. 1).

In method step f), the improved settings established in method step e) are implemented on the relevant components, which is to say on the spatial light modulator for example, in automated fashion or optionally after a confirmation by a user. Now, the aberrations established in method step b) are at least partially compensated for, preferably compensated for as completely as possible, as a result of the improved settings of the spatial light modulator.

Then, further images 200 of the sample are recorded in step g), now using the improved settings, which is to say with at least partial compensation of the aberrations established in method step b).

In a manner known in principle, the reconstruction of the 3-D images can follow this in each case, although this is no longer depicted in FIG. 8.

The present invention provides a novel method and a novel apparatus for light field microscopy, which enable elegant improvements in the quality of the image reconstruction. The advantageous improvements can be applied not only to image data of the light field microscope itself, but also to other detectors and other contrast methods, which are obtained using the same imaging system.

LIST OF REFERENCE SIGNS AND USED ABBREVIATIONS

1 Light source (laser)
2 Excitation light
3 Dichroic beam splitter
4 Microscope objective
5 Sample
6 Emission light
7 Intermediate image plane
8 Relay optical unit
9 Multi-lens array
10 Fourier plane (optically conjugate to the BFP of the microscope objective 4)
11 Detector (camera, in the image plane)
12 Control and evaluation unit
41 Immersion medium, for example immersion oil
51 Coverslip
52 Embedding medium
53 Sample unit
54 Microscope slide
55 Petri dish
100 Light field microscope
200 Image from the light field microscope
201 Partial image
227 Partial image
245 Central partial image
289 Partial image
a Selected position to be analysed in the partial image
b Position adjacent to position a
BFP Back objective pupil (back focal plane)
LFM Light field microscope
LSM Laser scanning microscope
MLA Multi-lens array
p1-p9 Portions from various partial images
PSF Point spread function
Z Optical axis

What is claimed is:
1. Microscopy method, wherein the following method steps are performed:
  a) a light field microscope records at least one image of a sample, said image consisting of a set of partial images,
  b) at least one aberration of an imaging system of the light field microscope is specified by a user, c) one or both of method steps d) and e) below are performed using the at least one aberration of the imaging system:

d) reconstructing a three-dimensional image of the sample from the set of partial images, wherein the at least one aberration of the imaging system is at least partially corrected;

e) establishing improved settings of adjustable components of the imaging system which influence wavefronts of the propagated light, on the basis of the at least one aberration of the imaging system;

wherein the specification of the aberration of the imaging system of the light field microscope in method step b) is brought about by a user input of at least one parameter of at least one component of the imaging system which characterizes or accompanies the relevant aberration.

2. Method according to claim 1, wherein at least one of the following parameters is specified by a user in method step b):

refractive index of an embedding medium in which the sample is embedded, distance of the sample from the coverslip, effective thickness of the embedding medium, distance of the sample to be examined from the microscope objective, thickness of a coverslip and refractive index of an immersion medium.

3. Method according to claim 1, wherein, in method step b) at least one aberration of the imaging system is established from the set of partial images recorded in method step a).

4. Method according to claim 3, wherein, in order to establish the at least one aberration, images are recorded at a plurality of different distances of the sample relative to a microscope objective.

5. Method according to claim 3, wherein disturbing image components in the partial images are removed or reduced before the partial images are evaluated in method step b) for the purpose of establishing the at least one aberration.

6. Method according to claim 3, wherein at least one of the following aberrations is established as aberration:

spherical aberration, axial astigmatism and field-dependent astigmatism.

7. Method according to claim 3, wherein wavefront aberrations permitted for the purpose of establishing aberrations are restricted to permitted forms that are to be defined.

8. Method according to claim 7, wherein the wavefront aberrations are restricted to a finite number of Zernike polynomials within the scope of establishing aberrations.

9. Method according to claim 3, wherein at least one aberration is established in method step b) by evaluating at least one microscopic structure of the sample in the partial images recorded in method step a).

10. Method according to claim 3, wherein at least one aberration is established in method step b) by determining at least one actually present parameter of at least one component of the imaging system which accompanies the relevant aberration.

11. Method according to claim 10, wherein the actually present parameter accompanying the relevant aberration is determined by evaluating the microscopic structure of the sample in the partial images, with consideration being given to at least one nominal parameter or standard parameter of at least one component of the imaging system.

12. Method according to claim 11, wherein the nominal parameters or standard parameters of the imaging system contain parameters of at least one of the following components: microscope objective, immersion medium, embedding medium, coverslip, and standard immersion objective.

13. Method according to claim 10, wherein at least one of the following parameters is determined:

a distance of the sample relative to the microscope objective, a refractive index of an embedding medium in which the sample is embedded, a refractive index of the sample, focal length of the microscope objective, thickness and/or refractive index of an immersion medium, thickness of a coverslip.

14. Method according to claim 3, wherein the following method steps are performed:

I) a sample structure which appears suitable for establishing the at least one aberration is searched for in one of the partial images, II) a pose in the z-coordinate is established for this sample structure by virtue of the sample structure being searched for in the partial images and the respective positions of the sample structure in the partial images being compared with positions that are to be expected in the respective partial images for a specific z-coordinate, III) wherein the z-value that fits best to the observed positions of the sample structure in the partial images is taken as the value for the z-coordinate of the sample structure, and IV) the wavefront error for the partial images is determined in each case by comparing the positions of the sample structure in the partial images, as expected in each case on account of the obtained z-coordinate, with the respectively observed positions of the sample structure in the partial images.

15. Method according to claim 14, wherein, in step III), the comparison is in each case performed by calculating a cross correlation of at least one portion of a reference image containing the sample structure at least with corresponding portions of the partial images and the z-value which fits best to the results of the cross correlations is taken as the value for the Z-coordinate of the sample structure.

16. Method according to claim 15, wherein, in step IV), the wavefront error for the partial images is determined in each case by comparing displacements which are expected in the partial images in each case on account of the obtained z-coordinate with the results of the cross correlations respectively obtained for the partial images.

17. Method according to claim 15,
wherein
the reference image is a partial image which belongs to a
lens in the multi-lens array lying symmetrically with
respect to the optical axis.

18. Method according to claim 3,
wherein, prior to the at least one aberration of the imaging
system being established from the partial images, a
three-dimensional image is reconstructed from the par-
tial images without error correction.

19. Method according to claim 18,
wherein
at least one structure sufficiently localized in the z-coor-
dinate is selected from the three-dimensional image
reconstructed without error correction,
partial images in the camera plane are calculated for the
selected structure, the calculated partial images are
compared with the measured partial images and the at
least one aberration of the imaging system are deter-
mined from the result of the comparison using the
z-coordinate of the selected structure.

20. Method according to claim 19,
wherein
the comparison of the calculated partial images with the
measured partial images is performed by virtue of cross
correlations of the calculated partial images with the
measured partial images being calculated.

21. Method according to claim 20,
wherein
the image plane which lies perpendicular to the optical
axis and for which the calculated cross correlations
with the measured partial images supply maximum
values is selected from the three-dimensional image
reconstructed without the error correction.

22. Method according to claim 19,
wherein
the determined at least one aberration of the imaging
system is adapted between the iteration steps in itera-
tive methods for reconstructing the three-dimensional
image.

23. Method according to claim 1,
wherein
i) a three-dimensional image is reconstructed from a
measured image of the sample using a specified aber-
ration,
ii) an image in the camera plane is calculated for the
obtained three-dimensional image,
iii) a comparison with the measured image is performed
for the image in the camera plane calculated thus,
iv) the aberration specified in step i) is varied on the basis
of the result of the comparison, and
v) steps i) to iv) are repeated until a sufficient correspon-
dence is obtained between the calculated image in the
camera plane and the measured image.

24. Method according to claim 1,
wherein
the reconstruction of the three-dimensional image with
the correction of the at least one aberration of the
imaging system is implemented by reconstructing the
actual partial images with corrected point spread func-
tions of the individual lenses in the multi-lens array.

25. Method according to claim 24,
wherein
the corrected point spread functions used for the recon-
struction are recalculated with consideration being
given to the at least one aberration of the imaging
system.

26. Method according to claim 24,
wherein
the point spread functions used for the reconstruction are
modified by a correction term which gives consider-
ation to the at least one aberration of the imaging
system.

27. Method according to claim 24,
wherein
an iterative method is used for the reconstruction.

28. Method according to claim 1,
wherein
improved settings for one or more of the following
components are established in method step e):
adjustable microscope objective,
adaptive mirror,
spatial light modulator,
position-variable, shape-variable and/or angle-variable
mirror.

29. Method according to claim 1,
wherein
the improved settings of the respective component of the
imaging system, as established in method step e), are
displayed to a user.

30. Method according to claim 1,
wherein
the improved settings of the respective component, as
established in method step e), are applied to at least one
of the respective components, optionally following a
confirmation by a user.

31. Microscopy apparatus, comprising:
a light field microscope having a light source for emitting
excitation light,
an illumination beam path for guiding the excitation light
onto or into a sample,
a two-dimensionally spatially resolving detector for
detecting light emitted by the sample,
a detection beam path at least having a microscope
objective and a multi-lens array for imaging light
emitted by the sample onto the detector and
a control and evaluation unit for controlling the light
source and the detector and for evaluating the measure-
ment data obtained by the detector, wherein the control
and evaluation unit is configured
A) to control the light source and the detector to record at
least one image of the sample, an image comprising in
each case a set of partial images;
B) to specify at least one aberration of the imaging system
of the light field microscope in accordance with a user
input,
C) to perform one or both of steps D) and E) below using
the aberrations of the imaging system specified:
D) reconstruct a three-dimensional image of the sample
from the set of partial images with at least partial
correction of the aberrations specified; and
E) establish improved settings of adjustable components
of the imaging system which influence wavefronts of
the propagated light, on the basis of the aberrations
specified,
wherein the specification of an aberration of the imag-
ing system of the light field microscope in method
step B) is brought about by a user input of at least one
parameter of at least one component of the imaging
system which characterizes or accompanies the rel-
evant aberration.

32. Microscopy apparatus according to claim 31, wherein the detection beam path comprises at least one sample unit.

33. Microscopy apparatus according to claim 32, wherein the sample unit comprises one or more of the following components: coverslip, embedding medium in which the sample to be examined is embedded, microscope slide, petri dish, immersion medium.

34. Microscopy apparatus according to claim 31, wherein at least one of the following components is present as the adjustable components of the imaging system which influence wavefronts of the propagated light:

adjustable microscope objective, adaptive mirror, spatial light modulator.

35. Microscopy apparatus according to claim 31, further comprising a laser scanning microscope for examining the sample, wherein the microscope objective is at least a part of a detection beam path of the laser scanning microscope.

\* \* \* \* \*